US012720342B2

(12) United States Patent
Fujishiro et al.

(10) Patent No.: US 12,720,342 B2
(45) Date of Patent: Aug. 25, 2026

(54) COMMUNICATION CONTROL METHOD, RELAY USER EQUIPMENT, AND REMOTE USER EQUIPMENT

(71) Applicant: KYOCERA CORPORATION, Kyoto (JP)

(72) Inventors: Masato Fujishiro, Yokohama (JP); Henry Chang, San Diego, CA (US)

(73) Assignee: KYOCERA CORPORATION, Kyoto (JP)

( * ) Notice: Subject to any disclaimer, the term of this patent is extended or adjusted under 35 U.S.C. 154(b) by 406 days.

(21) Appl. No.: 18/194,901

(22) Filed: Apr. 3, 2023

(65) Prior Publication Data

US 2023/0239714 A1 Jul. 27, 2023

Related U.S. Application Data

(63) Continuation of application No. PCT/JP2021/036406, filed on Oct. 1, 2021.

(60) Provisional application No. 63/086,152, filed on Oct. 1, 2020.

(51) Int. Cl.
*H04W 24/08* (2009.01)
*H04W 76/20* (2018.01)
*H04W 92/18* (2009.01)

(52) U.S. Cl.
CPC .......... *H04W 24/08* (2013.01); *H04W 76/20* (2018.02); *H04W 92/18* (2013.01)

(58) Field of Classification Search
None
See application file for complete search history.

(56) References Cited

U.S. PATENT DOCUMENTS 10,045,386 B2 8/2018 Raghothaman et al.
2018/0092027 A1 3/2018 Sheng
2018/0123682 A1 5/2018 Jung et al.
2018/0152986 A1 5/2018 Jung et al.
2019/0320361 A1 10/2019 Uchiyama et al.
2020/0008127 A1 1/2020 Ohtsuji
(Continued)

FOREIGN PATENT DOCUMENTS

JP 2015-521455 A 7/2015
JP 2018-026625 A 2/2018
(Continued)

OTHER PUBLICATIONS

"3rd Generation Partnership Project; Technical Specification Group Radio Access Network; NR; NR and NG-RAN Overall Description; Stage 2"; Release 16; 3GPP TS 38.300 V16.2.0 (Jul. 2020); Jul. 2020; pp. 1-6.

(Continued)

*Primary Examiner* — Peter P Chau
(74) *Attorney, Agent, or Firm* — Studebaker Brackett PLLC

(57) ABSTRACT

A communication control method used in a cellular communication system includes determining, by a remote user equipment having sidelink connection with a relay user equipment, a network communication state between the remote user equipment and a cellular communication network, and performing, by the remote user equipment, control related to sidelink communication between the remote user equipment and the relay user equipment, based on the network communication state.

3 Claims, 16 Drawing Sheets

RELAY UE MESSAGE

| INFORMATION TYPE | INFORMATION ELEMENT | DETAILS |
|---|---|---|
| NETWORK COMMUNICATION STATE<br>* STATE OF Uu<br>* CASE OF U2N RELAY | RRC STATE | Connected, Inactive, Idle |
| | COVERAGE STATE | In-coverage, Out-of-coverage |
| | RADIO STATE | RSRP, RSRQ, SINR |
| | USE FREQUENCY BAND | Licensed spectrum, Unlicensed spectrum, Shared spectrum |
| | | (FREQUENCY RANGE SUCH AS) FR1 AND FR2 |
| | | BANDWIDTH (e.g., 100 MHz) |
| | LINK STATE | THROUGHPUT (DATA RATE) |
| | | LATENCY |
| | LOAD STATE | RESOURCE UTILIZATION AND THE LIKE |
| SIDELINK COMMUNICATION STATE (WITH OTHER UE)<br>* PC5 STATE<br>* CASE OF U2U RELAY | USE FREQUENCY BAND | SAME AS ABOVE |
| | RADIO STATE | RSRP, RSRQ, SINR OF EACH OF OTHER UEs (OF EACH OF PC5-RRC CONNECTIONS) |
| | | CBR MEASUREMENT RESULTS |
| | LINK STATE | SAME AS ABOVE |
| | LOAD STATE | SAME AS ABOVE |
| RELAY CAPABILITY INFORMATION<br>* INFORMATION ASSUMED TO BE HELD IN UPPER LAYER (PC5-S) | RELAY MODE | U2N, U2U, BOTH |
| | LOAD STATE | UTILIZATION OF CPU AND MEMORY, AND THE LIKE |
| | BATTERY STATE | CONNECTED TO POWER SUPPLY, USING BATTERY, LOW BATTERY |

(56) References Cited

U.S. PATENT DOCUMENTS

| | | | | |
|---|---|---|---|---|
| 2021/0037438 | A1 | 2/2021 | Uchiyama et al. | |
| 2021/0120476 | A1 | 4/2021 | Lee et al. | |
| 2021/0289401 | A1 | 9/2021 | Xu et al. | |
| 2023/0074899 | A1 | 3/2023 | Wang et al. | |
| 2023/0319937 | A1* | 10/2023 | Wang | H04W 76/19 370/315 |
| 2023/0328807 | A1* | 10/2023 | Wu | H04L 1/08 370/329 |
| 2023/0328828 | A1 | 10/2023 | Wu et al. | |
| 2023/0362881 | A1* | 11/2023 | Wu | H04W 40/22 |
| 2024/0259906 | A1* | 8/2024 | Freda | H04W 40/22 |

FOREIGN PATENT DOCUMENTS

| | | | |
|---|---|---|---|
| JP | 2020-518140 | A | 6/2020 |
| JP | 2023-527610 | A | 6/2023 |
| WO | 2017/051859 | A1 | 3/2017 |
| WO | 2018/194390 | A1 | 10/2018 |
| WO | 2020/068991 | A1 | 4/2020 |
| WO | 2021/159823 | A1 | 8/2021 |

OTHER PUBLICATIONS

LG Electronics Inc., "[Running CR] Introduction of 5G V2X with NR Sidelink", 3GPP TSG-RAN WG2 Meeting #108, R2-1916030, Reno, USA, Nov. 18-22, 2019, total 4 pages.

* cited by examiner

UE to NW RELAY (U2N RELAY)
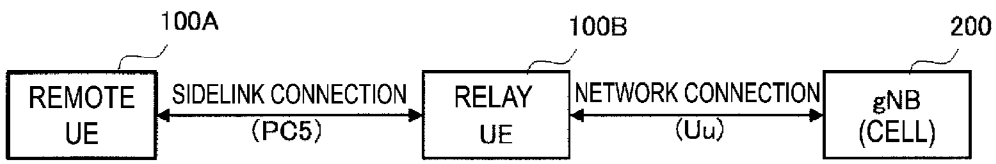
UE to UE RELAY (U2U RELAY)
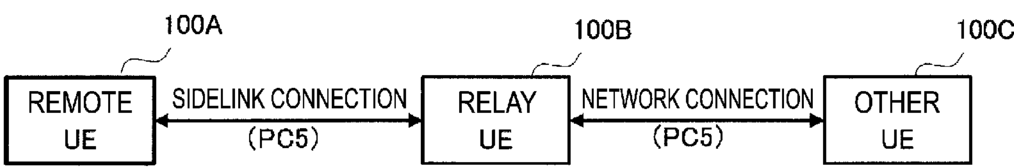
FIG. 6

RELAY UE MESSAGE

| INFORMATION TYPE | INFORMATION ELEMENT | DETAILS |
|---|---|---|
| NETWORK COMMUNICATION STATE * STATE OF Uu * CASE OF U2N RELAY | RRC STATE | Connected, Inactive, Idle |
| | COVERAGE STATE | In-coverage, Out-of-coverage |
| | RADIO STATE | RSRP, RSRQ, SINR |
| | USE FREQUENCY BAND | Licensed spectrum, Unlicensed spectrum, Shared spectrum |
| | | (FREQUENCY RANGE SUCH AS) FR1 AND FR2 |
| | | BANDWIDTH (e.g., 100 MHz) |
| | LINK STATE | THROUGHPUT (DATA RATE) |
| | | LATENCY |
| | LOAD STATE | RESOURCE UTILIZATION AND THE LIKE |
| SIDELINK COMMUNICATION STATE (WITH OTHER UE) * PC5 STATE * CASE OF U2U RELAY | USE FREQUENCY BAND | SAME AS ABOVE |
| | RADIO STATE | RSRP, RSRQ, SINR OF EACH OF OTHER UEs (OF EACH OF PC5-RRC CONNECTIONS) |
| | | CBR MEASUREMENT RESULTS |
| | LINK STATE | SAME AS ABOVE |
| | LOAD STATE | SAME AS ABOVE |
| RELAY CAPABILITY INFORMATION * INFORMATION ASSUMED TO BE HELD IN UPPER LAYER (PC5-S) | RELAY MODE | U2N, U2U, BOTH |
| | LOAD STATE | UTILIZATION OF CPU AND MEMORY, AND THE LIKE |
| | BATTERY STATE | CONNECTED TO POWER SUPPLY, USING BATTERY, LOW BATTERY |

FIG. 10

COMMUNICATION CONTROL METHOD, RELAY USER EQUIPMENT, AND REMOTE USER EQUIPMENT

RELATED APPLICATIONS

The present application is a continuation based on PCT Application No. PCT/JP2021/036406, filed on Oct. 1, 2021, which claims the benefit of U.S. Provisional Application No. 63/086,152 filed on Oct. 1, 2020. The content of which is incorporated by reference herein in their entirety.

TECHNICAL FIELD

The present invention relates to a communication control method, a relay user equipment, and a remote user equipment used in a cellular communication system.

BACKGROUND OF INVENTION

In recent years, a cellular communication system of a fifth generation (5G) has been attracting attention. In New Radio (NR) being a Radio Access Technology (RAT) of a 5G system, sidelink communication has been introduced, in which wireless communication is directly performed between user equipments.

CITATION LIST

Non-Patent Literature

NPL 1: 3GPP Technical Specification "3GPP TS 38.300 V16.2.0 (2020 July)"

SUMMARY

In a first aspect, a communication control method is a communication control method used in a cellular communication system and includes determining, by a remote user equipment having a sidelink connection with a relay user equipment, a network communication state between the remote user equipment and a cellular communication network, and performing, by the remote user equipment, control related to sidelink communication between the remote user equipment and the relay user equipment, based on the network communication state.

In a second aspect, a remote user equipment is a remote user equipment used in a cellular communication system and includes a controller that determines, in a state of the remote user equipment having a sidelink connection with a relay user equipment, a network communication state between the remote user equipment and a cellular communication network. The controller performs control related to sidelink communication between the remote user equipment and the relay user equipment, based on the network communication state.

In a third aspect, a communication control method is a communication control method used in a cellular communication system and includes determining, by a relay user equipment having a sidelink connection with a remote user equipment, a communication state between the relay user equipment and a cellular communication network or a communication state between the relay user equipment and a different user equipment, and performing, by the relay user equipment, control related to sidelink communication between the relay user equipment and the remote user equipment, based on the communication state determined.

In a fourth aspect, a relay user equipment is a relay user equipment used in a cellular communication system and includes a controller that determines, in a state of the relay user equipment having a sidelink connection with a remote user equipment, a communication state between the relay user equipment and a cellular communication network or a communication state between the relay user equipment and a different user equipment. The controller performs control related to sidelink communication between the relay user equipment and the remote user equipment, based on the communication state determined.

BRIEF DESCRIPTION OF THE DRAWINGS

FIG. 6 is a diagram illustrating sidelink relay according to an embodiment.

FIG. 10 is a diagram illustrating a relay UE message according to an embodiment.

DESCRIPTION OF EMBODIMENTS

A study has been carried out on sidelink relay in which a relay user equipment relays data of a remote user equipment using sidelink communication. The remote user equipment having sidelink connection with the relay user equipment can perform communication with a cellular communication network or another user equipment via the relay user equipment. However, after such sidelink communication is started, a change in a status of the user equipment, such as movement of the user equipment, may occur, which can make it difficult to appropriately perform sidelink communication.

The present disclosure has an object to enable sidelink communication to be appropriately performed.

A cellular communication system according to an embodiment will be described with reference to the drawings. In the description of the drawings, the same or similar parts are denoted by the same or similar reference signs.

Configuration of Cellular Communication System

Figure 1:
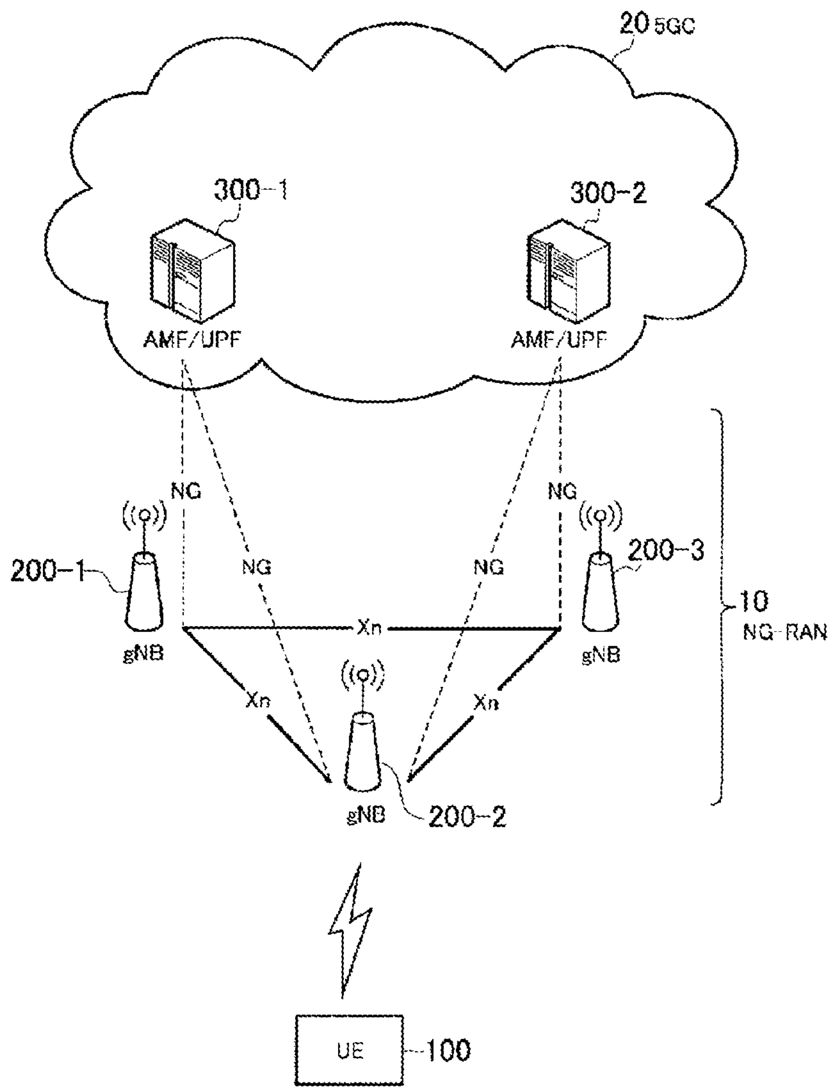
FIG. 1 is a diagram illustrating a configuration of a cellular communication system according to an embodiment.

First, a configuration of the cellular communication system according to an embodiment will be described. FIG. 1 is a diagram illustrating a configuration of the cellular communication system according to an embodiment. This cellular communication system complies with the 5th Generation System (5GS) of the 3GPP standard. The description below takes the 5GS as an example, but Long Term Evolution (LTE) system may be at least partially applied to the cellular communication system.

As illustrated in FIG. 1, the cellular communication system includes a User Equipment (UE) 100, a 5G radio access network (Next Generation Radio Access Network (NG-RAN)) 10, and a 5G Core Network (5GC) 20. The radio access network and the core network are collectively referred to as a cellular communication network.

The UE 100 is a mobile wireless communication apparatus. The UE 100 may be any apparatus as long as utilized by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or a plurality of cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signaling. The UPF controls data transfer. The AMF and UPF are connected to the gNB 200 via an NG interface which is an interface between a base station and the core network.

Figure 2:
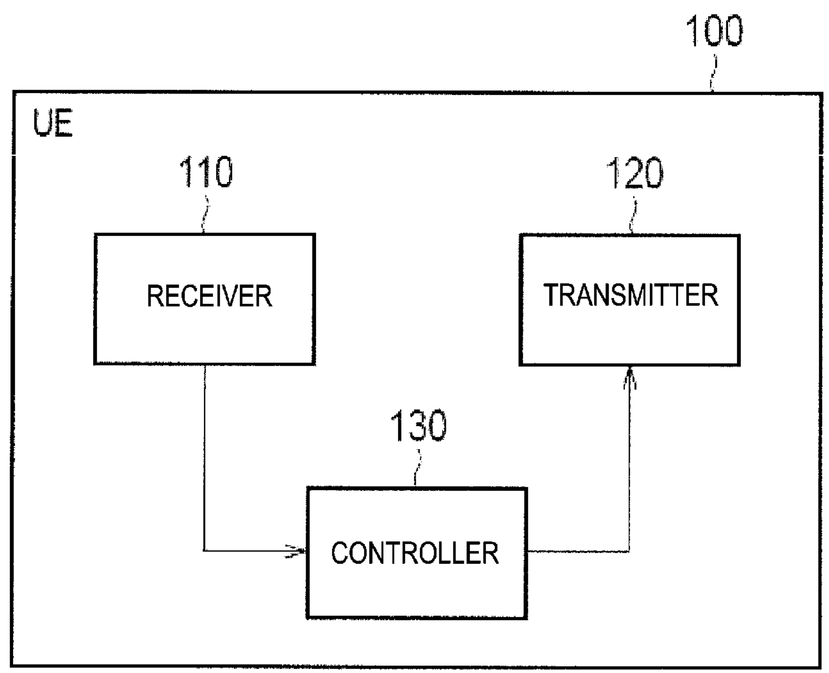
FIG. 2 is a diagram illustrating a configuration of a user equipment (UE) according to an embodiment.

FIG. 2 is a diagram illustrating a configuration of the UE 100 (user equipment) according to an embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various types of control in the UE 100. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
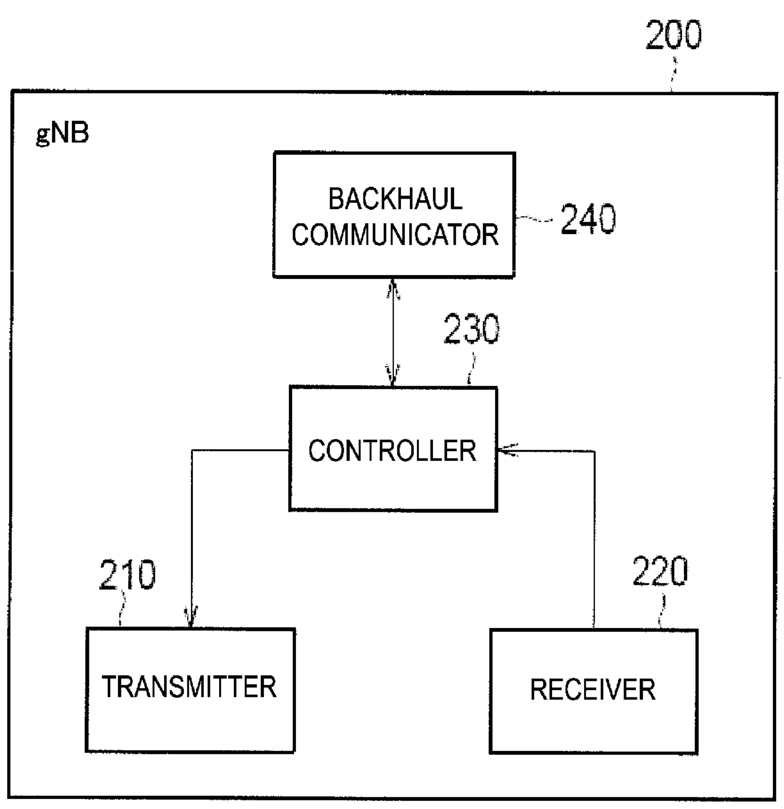
FIG. 3 is a diagram illustrating a configuration of a base station (gNB) according to an embodiment.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
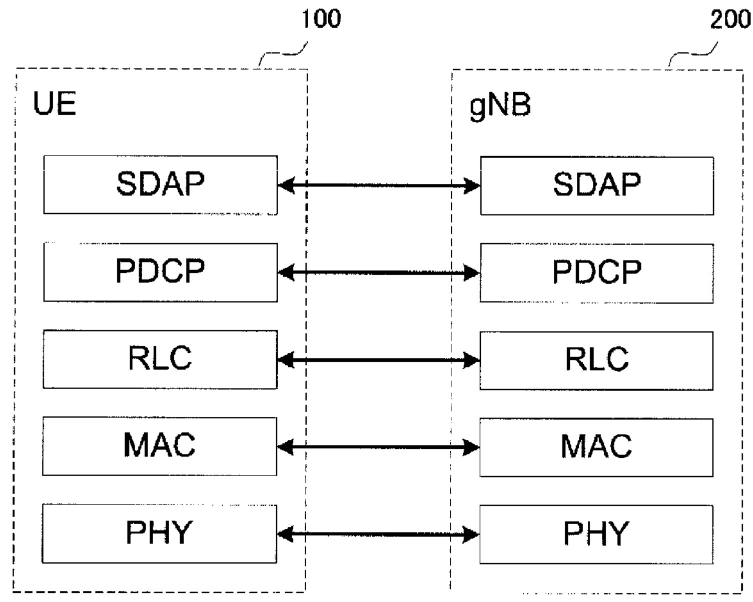
FIG. 4 is a diagram illustrating a configuration of a protocol stack of a radio interface of a user plane handling data.

FIG. 4 is a diagram illustrating a configuration of a protocol stack of a radio interface of a user plane handling data.

As illustrated in FIG. 4, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs preferential control of data, retransmission processing using a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow as the unit of QoS control by a core network and a radio bearer as the unit of QoS control by an Access Stratum (AS). Note that, when the RAN is connected to the EPC, the SDAP may not be provided.

Figure 5:
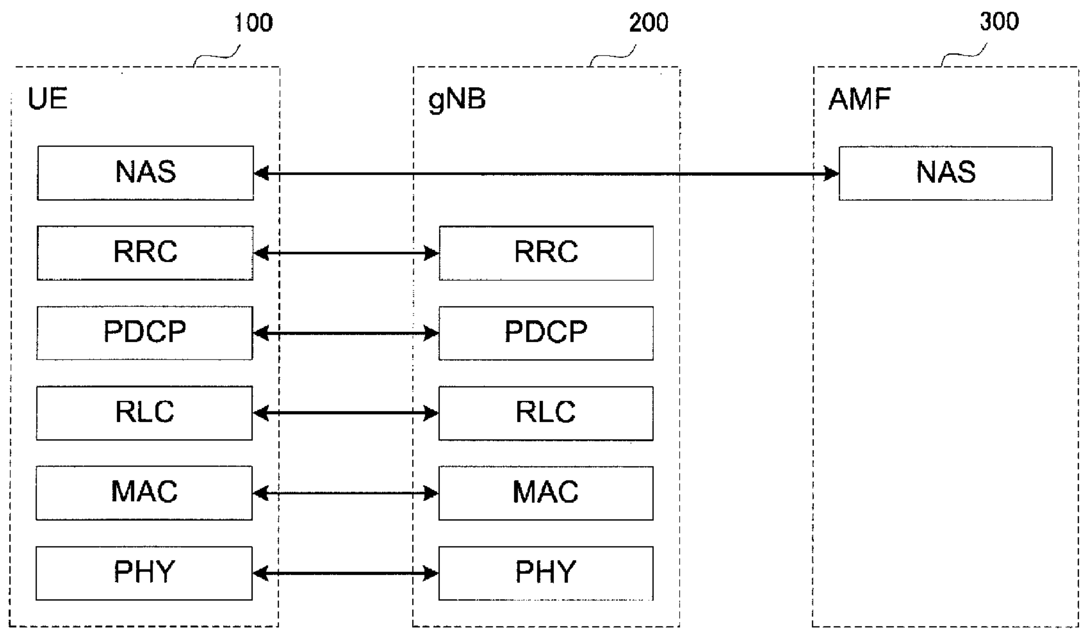
FIG. 5 is a diagram illustrating a configuration of a protocol stack of a radio interface of a control plane handling signaling (control signal).

FIG. 5 is a diagram illustrating a configuration of a protocol stack of a radio interface of a control plane handling signaling (control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, reestablishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is higher than the RRC layer performs session management, mobility management, and the like. NAS signaling is transmitted between the NAS layer of the UE 100 and the NAS layer of the AMF 300.

Note that the UE 100 includes an application layer other than the protocol of the radio interface.

Overview of Sidelink Relay

An overview of sidelink relay according to an embodiment will be described. FIG. 6 is a diagram illustrating sidelink relay according to an embodiment.

As illustrated in FIG. 6, the sidelink relay includes two modes, i.e., UE-to-NW relay (U2N relay) and UE-to-UE relay (U2U relay).

The U2N relay is a mode in which a relay UE 100B performs relay between a remote UE 100A and a gNB 200 (cell). Here, sidelink connection is established between the relay UE 100B and the remote UE 100A, and network connection is established between the relay UE 100B and the gNB 200. Note that the sidelink is a direct link between the UEs 100 and may also be referred to as a PC5 interface. The sidelink connection may be referred to as PC5-S connection or PC5-RRC connection. The network connection refers to connection between the UE 100 and the cellular communication network (gNB 200), and may be referred to as NAS connection, RRC connection, or a Uu interface.

The relay UE 100B is located within the coverage of a cell of the gNB 200 (the coverage thereof is hereinafter simply referred to as the "coverage"). In contrast, the remote UE 100A is located out of the coverage. According to the U2N relay, the remote UE 100A out of the coverage (so-called out of service) can perform network communication via the relay UE 100B. Note that the remote UE 100A may be located within the coverage.

The U2U relay is a mode in which the relay UE 100B performs relay between the remote UE 100A and another UE 100C. Here, sidelink connection is established between the relay UE 100B and the remote UE 100A and between the relay UE 100B and another UE 100C. Each of the remote UE 100A, the relay UE 100B, and another UE 100C may be located within the coverage or may be located out of the coverage. Note that sidelink connection may be indirectly established between the remote UE 100A and another UE 100C via the relay UE 100B.

According to the U2U relay, for example, even when direct sidelink communication between the remote UE 100A and another UE 100C cannot be performed in an area out of the coverage, the remote UE 100A can indirectly perform sidelink communication therewith via the relay UE 100B.

Figure 7:
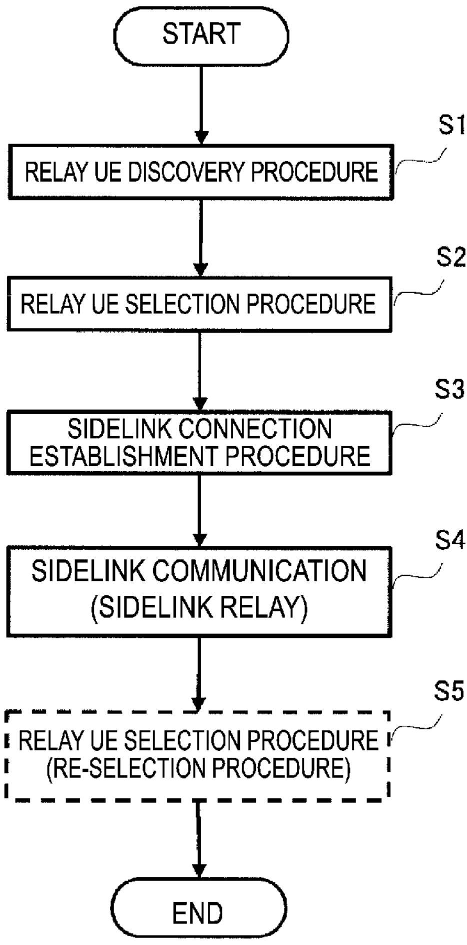
FIG. 7 is a diagram illustrating an overall flow related to the sidelink relay according to an embodiment.

FIG. 7 is a diagram illustrating an overall flow related to the sidelink relay according to an embodiment. The following description is based on an assumption that the remote UE 100A has already established network connection with the cellular communication network (gNB 200) or sidelink connection with another UE 100C.

As illustrated in FIG. 7, in Step S1, the remote UE 100A and the relay UE 100B perform a relay UE discovery procedure. The relay UE discovery procedure has a method in which the relay UE 100B gives a notification of presence of the relay UE 100B itself through transmission of a discovery message, and a method in which the remote UE 100A searches for the relay UE 100B through transmission of a discovery message. Such a transmitted discovery message may be a message dedicated to discovery or may be an existing message for establishing sidelink connection. Note that the remote UE 100A may transmit a discovery message indicating presence of the remote UE 100A itself, or the relay UE 100B may transmit a discovery message for searching for the remote UE 100A. Through the relay UE discovery procedure, the remote UE 100A discovers the relay UE 100B. Here, the remote UE 100A may discover a plurality of relay UEs 100B as candidates.

In Step S2, the remote UE 100A performs a relay UE selection procedure of selecting the relay UE 100B for relaying data of the remote UE 100A. When only one relay UE 100B is discovered in Step S1, in the relay UE selection procedure, the remote UE 100A may select the one relay UE 100B, depending on whether the one discovered relay UE 100B satisfies a predetermined condition. In contrast, when a plurality of relay UEs 100B are discovered in Step S1, in the relay UE selection procedure, the remote UE 100A may select one relay UE 100B out of the plurality of discovered relay UEs 100B. Details of the relay UE selection procedure will be described below.

In Step S3, the remote UE 100A and the relay UE 100B perform a sidelink connection establishment procedure of establishing sidelink connection. For example, sidelink connection is established by the remote UE 100A and the relay UE 100B transmitting and receiving messages (for example, RRCReconfigurationSidelink, RRCReconfigurationCompleteSidelink) of a PC5-RRC layer to be described below. The sidelink connection establishment procedure may include transmission and reception of messages (for example, DIRECT LINK ESTABLISHMENT REQUEST, DIRECT LINK ESTABLISHMENT ACCEPT) of a PC5-S layer to be described below.

In Step S4, the remote UE 100A performs sidelink communication with the relay UE 100B, and transmits and receives data to and from the relay UE 100B. The relay UE 100B relays the data transmitted and received by the remote UE 100A (sidelink relay).

In Step S5, the remote UE 100A may perform another relay UE selection procedure. Specifically, the remote UE 100A may perform a relay UE re-selection procedure for switching from the current relay UE 100B to another relay UE 100B.

Protocol Stack of Sidelink

A configuration of a protocol stack of a sidelink according to an embodiment will be described.

Figure 8:
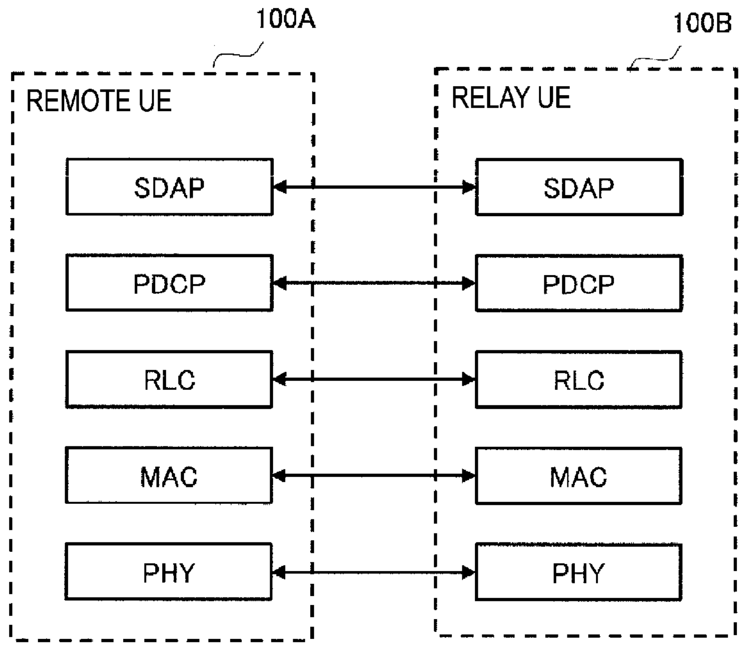
FIG. 8 is a diagram illustrating a configuration of a protocol stack of a sidelink of a user plane handling data.

FIG. 8 is a diagram illustrating a configuration of a protocol stack of a sidelink of a user plane handling data. As illustrated in FIG. 8, the sidelink protocol of the user plane includes a PHY layer, a MAC layer, an RLC layer, a PDCP layer, and an SDAP layer.

The PHY layer performs coding and decoding, modulation and demodulation, antenna mapping and demapping, and resource mapping and demapping. Data and control information are transmitted between the PHY layer of the remote UE 100A and the PHY layer of the relay UE 100B via a physical channel.

The MAC layer performs priority control of data, retransmission processing by HARQ, and the like. Data and control information are transmitted between the MAC layer of the remote UE 100A and the MAC layer of the relay UE 100B via a transport channel.

The RLC layer transmits data to the RLC layer on the reception side by using functions of the MAC layer and the PHY layer. Data and control information are transmitted between the RLC layer of the remote UE 100A and the RLC layer of the relay UE 100B via a logical channel. The PDCP layer performs header compression and decompression, and encryption and decryption. The SDAP layer performs mapping between an IP flow as the unit of QoS control by a core network and a radio bearer as the unit of QoS control by an AS.

Figure 9:
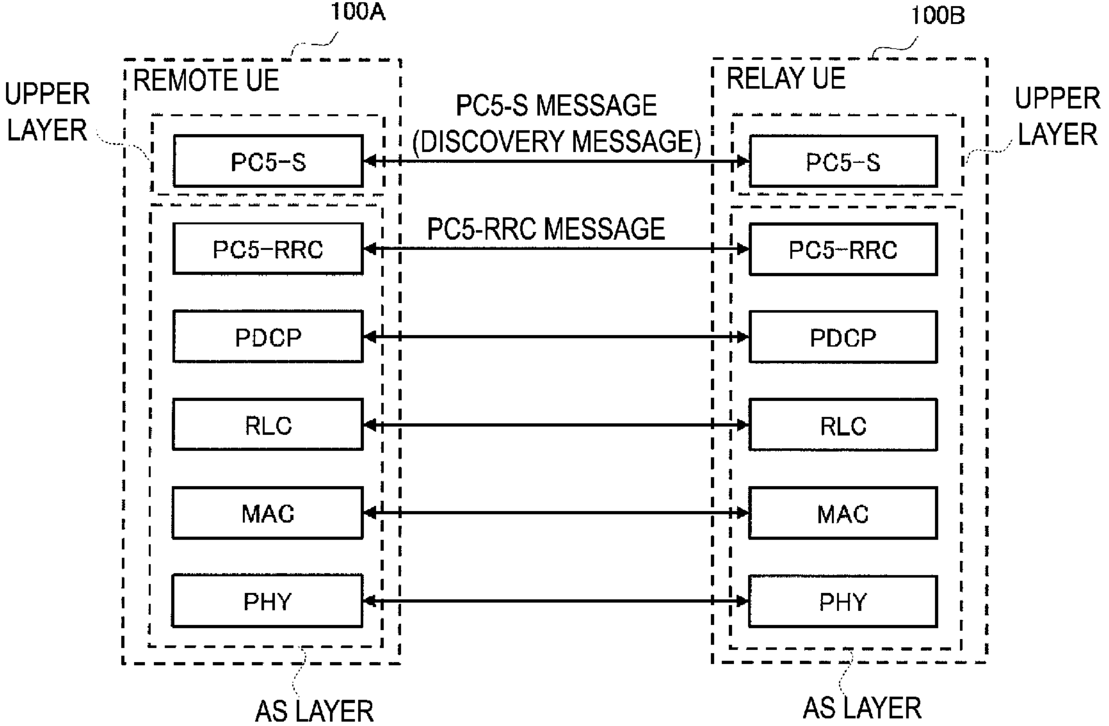
FIG. 9 is a diagram illustrating a configuration of a protocol stack of a sidelink of a control plane handling signaling (control signal).

FIG. 9 is a diagram illustrating a configuration of a protocol stack of a sidelink of a control plane handling signaling (control signal).

As illustrated in FIG. 9, the protocol stack of the sidelink of the control plane includes a PC5-RRC layer and a PC5-S layer instead of the SDAP layer illustrated in FIG. 8.

A PC5-RRC message for various configurations is transmitted between the PC5-RRC layer of the remote UE 100A and the PC5-RRC layer of the relay UE 100B. When a connection (PC5-RRC connection) between the PC5-RRC of the remote UE 100A and the PC5-RRC of the relay UE 100B is present, the remote UE 100A may be in a PC5-RRC connected state. Note that the AS layer includes the PC5-RRC layer.

The PC5-S layer is located in an upper layer of the PC5-RRC layer (AS layer). A PC5-S message such as a discovery message is transmitted between the PC5-S layer of the remote UE 100A and the PC5-S layer of the relay UE 100B.

Relay UE Selection Procedure

The relay UE selection procedure according to an embodiment will be described.

The remote UE 100A is enabled to use sidelink relay by selecting the relay UE 100B and establishing sidelink connection therewith, but if the remote UE 100A cannot select an appropriate relay UE 100B, the remote UE 100A cannot appropriately perform sidelink communication. The relay UE selection procedure according to an embodiment enables the remote UE 100A to select an appropriate relay UE 100B in the relay UE selection procedure.

The relay UE selection procedure according to an embodiment includes the steps of transmitting, by the relay UE 100B having capability of relaying data of the remote UE 100A, a message (hereinafter referred to as a "relay UE message") including information related to the relay UE 100B, receiving, by the remote UE 100A, the relay UE message, and performing, by the remote UE 100A, processing for establishing sidelink connection between the remote UE 100A and the relay UE 100B, based on the relay UE message. For example, the relay UE message is the PC5-RRC message of the PC5-RRC layer, or the discovery message of the PC5-S layer.

When only one relay UE 100B is discovered, in the relay UE selection procedure, the remote UE 100A may select the one relay UE 100B, based on the relay UE message received from the one relay UE 100B. In contrast, when a plurality of relay UEs 100B are discovered, in the relay UE selection procedure, the remote UE 100A may select one relay UE 100B, based on the relay UE message of each of the plurality of relay UEs 100B.

FIG. 10 is a diagram illustrating the relay UE message according to an embodiment.

As illustrated in FIG. 10, when the relay UE 100B has network connection with the cellular communication network, the relay UE message includes information indicating a network communication state between the relay UE 100B and the cellular communication network. With this, the remote UE 100A can select or re-select an appropriate relay UE 100B, with the network communication state between the relay UE 100B and the cellular communication network being taken into consideration.

When the relay UE 100B has sidelink connection with another UE 100C, the relay UE message includes information indicating a sidelink communication state between the relay UE 100B and another UE 100C. With this, the remote UE 100A can select or re-select an appropriate relay UE 100B, with the sidelink communication state between the relay UE 100B and another UE 100C being taken into consideration.

The relay UE message includes information indicating relay capability of the relay UE 100B. With this, the remote UE 100A can select or re-select an appropriate relay UE 100B, with the relay capability of the relay UE 100B being taken into consideration.

Specifically, information indicating the network communication state between the relay UE 100B and the cellular communication network includes at least one of the following information elements:

- An information element indicating an RRC state (one of RRC connected, RRC inactive, and RRC idle) between the relay UE 100B and the cellular communication network;
- An information element indicating a coverage state (one of within the coverage and out of the coverage) of the relay UE 100B;
- An information element indicating radio state (for example, one of RSRP, RSRQ, and SINR) between the relay UE 100B and the cellular communication network;
- An information element indicating a use frequency band between the relay UE 100B and the cellular communication network;

For example, the information element may indicate one of a Licensed spectrum being a frequency band granted a license, an Unlicensed spectrum being a frequency band that does not require a license, and a Shared spectrum being a frequency band that can be shared by a plurality of systems. The information element may indicate one of Frequency Range 1 (FR1) including frequencies of the 6 GHz band or lower, Frequency Range 2 (FR2) including millimeter waves from 24.25 GHz to 52.6 GHz having a wide frequency band despite a narrower communicable range than FR1, and other frequency ranges (such as FR3). The information element may indicate a bandwidth (for example, 100 MHz) of the use frequency band between the relay UE 100B and the cellular communication network;

- An information element indicating a link state (for example, one of throughput (data rate) and latency) between the relay UE 100B and the cellular communication network;
- An information element indicating a load state (for example, resource utilization and the like) between the relay UE 100B and the cellular communication network.

In contrast, information indicating the sidelink communication state between the relay UE 100B and another UE 100C includes at least one of the following information elements:

- An information element indicating a use frequency band between the relay UE 100B and another UE 100C;
- An information element indicating a radio state between the relay UE 100B and another UE 100C;

The information element may be RSRP, RSRQ, or SINR of each of such other UEs 100C (of each of PC5-RRC connections). The information element may be an information element indicating measurement results of a Channel Busy Ratio (CBR) indicating a degree of channel congestion between the relay UE 100B and another UE 100C;

- An information element indicating a link state between the relay UE 100B and another UE 100C;
- An information element indicating a load state between the relay UE 100B and another UE 100C.

In contrast, information indicating the relay capability of the relay UE 100B includes at least one of the following information elements. An upper layer (PC5-S layer) is assumed to hold these pieces of information:

- An information element indicating a relay mode (one of U2N, U2U, and both) of the relay UE 100B;

The information element may be based on a mode authenticated by a network;

- An information element indicating a load state (for example, CPU and memory utilization and the like) of the relay UE 100B;
- An information element indicating a battery state (for example, one of connected to a power supply, using a battery, a low battery) of the relay UE 100B.

Figure 11:
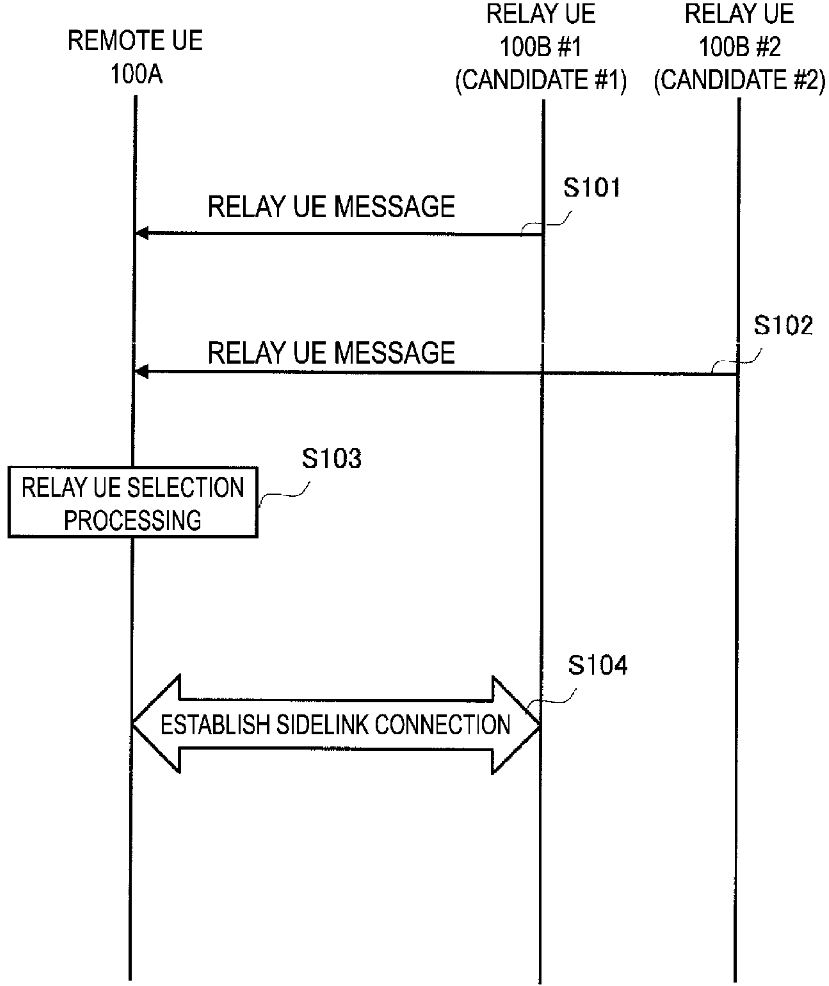
FIG. 11 is a diagram illustrating a sequence of a relay UE selection procedure according to an embodiment.

FIG. 11 is a diagram illustrating a sequence of the relay UE selection procedure according to an embodiment. Although the illustration is an example in which two relay UEs 100B are present as candidates, there may be three or more relay UEs 100B as candidates.

As illustrated in FIG. 11, in Step S101, relay UE 100B #1 transmits a relay UE message to the remote UE 100A.

When the relay UE message is the discovery message of the PC5-S layer, in relay UE 100B #1, the AS layer notifies an upper layer (PC5-S layer) of a network link state of the AS layer or another side link state (with another UE 100C). The upper layer (PC5-S layer) generates the discovery message by using state information from the AS layer and relay capability information in the upper layer (PC5-S layer) and transmits the discovery message as the relay UE message.

In contrast, when the relay UE message is the PC5-RRC message of the PC5-RRC layer, in relay UE 100B #1, the upper layer (PC5-S layer) notifies the AS layer of a relay capability state of the upper layer (PC5-S layer). The AS layer generates the PC5-RRC message by using relay capability information from the upper layer (PC5-S layer) and link state information in the AS layer and transmits the PC5-RRC message as the relay UE message.

A message format of the PC5-RRC message may be a PC5-RRC message broadcast in the sidelink (for example, existing MasterInformationBlockSidelink or a new message). Alternatively, the message format of the PC5-RRC message may be a PC5-RRC message used for sidelink connection establishment (for example, RRCReconfigurationSidelink, or RRCReconfigurationCompleteSidelink), a PC5-RRC message used for an inquiry and a response in the sidelink (for example, UECapabilityEnquirySidelink, or UECapabilityInformationSidelink), and/or a new inquiry and response message dedicated to relay. Regarding the inquiry and response message, the relay UE message is a response message, and the relay UE transmits the relay UE message (response message) in response to an inquiry from the remote UE.

In Step S102, relay UE 100B #2 transmits the relay UE message to the remote UE 100A.

In Step S103, based on the relay UE message of each of the plurality of relay UEs 100B (relay UE 100B #1 and relay UE 100B #2), the remote UE 100A selects one relay UE 100B to establish sidelink connection with out of the plurality of relay UEs 100B.

In such relay UE selection processing, the remote UE 100A may extract selection candidates, based on a radio state (for example, sidelink RSRP) between the remote UE 100A and each of the relay UEs 100B. The remote UE 100A may rank the candidates according to their sidelink radio states, and regard top n (for example, top five UEs) relay UEs 100B as the candidates. Alternatively, the remote UE 100A may regard relay UEs 100B within a certain range (for example, −10 dB or less) with respect to the radio state of the relay UE 100B having the best radio state as the candidates, or regard all of relay UEs 100B having the radio state of a threshold or higher (for example, −100 dBm or higher) as the candidates.

In the relay UE selection processing, the remote UE 100A compares the information elements included in the relay UE messages of the plurality of relay UEs 100B as the candidates with one another, and thereby selects one relay UE 100B. Note that which information element is used for selection of the relay UE and criteria for the selection (selection priority) may be configured from the gNB 200, may be defined in advance (pre-configuration), or may be configured by user configuration (user preference).

For example, regarding the RRC state included in the network communication state, the remote UE 100A may preferentially select the relay UE 100B in an RRC connected state over the relay UE 100B not in the RRC connected state. The remote UE 100A may perform relay UE selection in accordance with priority of RRC connected state>RRC inactive state>RRC idle state.

Regarding the coverage state included in the network communication state, the remote UE 100A may exclude the relay UE 100B within the coverage or the relay UE 100B out of the coverage from the candidates, depending on usage of each of U2N and U2U. The remote UE 100A may preferentially select the relay UE 100B within the coverage over the relay UE 100B out of the coverage.

Regarding the radio state (RSRP, RSRQ, SINR) included in the network communication state, the remote UE 100A may preferentially select the relay UE 100B having a satisfactory radio state over the relay UE 100B having a poor radio state.

Regarding the use frequency band included in the network communication state, the remote UE 100A may preferentially select the relay UE 100B using the Licensed spectrum over the relay UE 100B not using the Licensed spectrum. The remote UE 100A may preferentially select the relay UE 100B using FR2 over the relay UE 100B not using FR2. The remote UE 100A may preferentially select the relay UE 100B using a wide bandwidth over the relay UE 100B using a narrow bandwidth. Note that each of these priority criteria may be the opposite. For example, the remote UE 100A may prioritize the relay UE 100B not using the Licensed spectrum or may prioritize the relay UE 100B not using FR2.

Regarding the link state included in the network communication state, the remote UE 100A may preferentially select the relay UE 100B having high throughput over the relay UE 100B having low throughput. The remote UE 100A may preferentially select the relay UE 100B having low latency over the relay UE 100B having high latency.

Regarding the load state included in the network communication state, the remote UE 100A may preferentially select the relay UE 100B having a low load over the relay UE 100B having a high load.

Regarding the sidelink communication state as well, the remote UE 100A performs relay UE selection in a manner the same as and/or similar to the network communication state. Note that, regarding the radio state included in the sidelink communication state, the remote UE 100A may preferentially select the relay UE 100B having a satisfactory radio state for a communication destination of the remote UE 100A. The remote UE 100A may preferentially select the relay UE 100B having a low measurement value of CBR over the relay UE 100B having a high measurement value of CBR.

Moreover, regarding the relay capability information, the remote UE 100A may preferentially select the relay UE 100B of a relay mode suited to the usage of U2N and U2U of the remote UE 100A. The remote UE 100A may preferentially select the relay UE 100B having a low load state (CPU and memory utilization and the like) over the relay UE 100B having a high load state. Regarding the battery state, the remote UE 100A may preferentially select the relay UE 100B connected to a power supply.

After selecting one relay UE 100B through the relay UE selection processing, in Step S104, the remote UE 100A performs sidelink connection establishment processing for the selected relay UE 100B (here, relay UE 100B #1).

Figure 12:
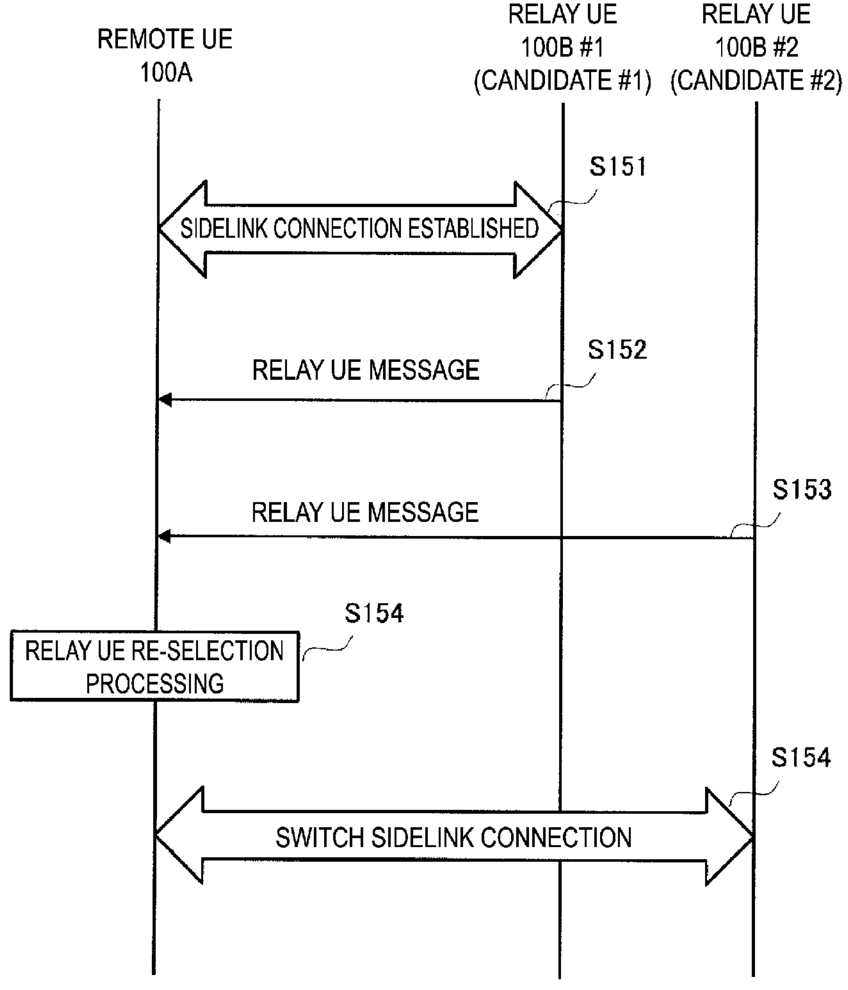
FIG. 12 is a diagram illustrating a sequence of a relay UE re-selection procedure according to an embodiment.

FIG. 12 is a diagram illustrating a sequence of the relay UE re-selection procedure according to an embodiment. Here, differences from the above-described relay UE selection procedure will be described.

As illustrated in FIG. 12, in Step S151, the remote UE 100A has sidelink connection being established with relay UE 100B #1. The remote UE 100A may trigger relay UE re-selection in response to deterioration of a sidelink radio state with relay UE 100B #1.

In Steps S152 and S153, the remote UE 100A receives a relay UE message from each of relay UE 100B #1 and relay UE 100B #2.

In Step S154, based on the relay UE message of each of relay UE 100B #1 and relay UE 100B #2, the remote UE 100A determines whether to perform switching (re-selection) to relay UE 100B #2. Criteria for such relay UE re-selection are the same as and/or similar to the criteria for relay UE selection described above. Here, description continues based on an assumption that the remote UE 100A determines to perform re-selection for relay UE 100B #2.

In Step S154, the remote UE 100A performs sidelink connection establishment processing for re-selected relay UE 100B #2. Note that the remote UE 100A releases the sidelink connection with relay UE 100B #1.

Sidelink Communication Control Sidelink communication control in a sidelink relay procedure according to an embodiment will be described.

The remote UE 100A having sidelink connection with the relay UE 100B can perform communication with the cellular communication network or another UE 100C via the relay UE 100B. However, after such sidelink communication is started, there may be a change to a state of the UE 100, such as movement, which may make it difficult to appropriately perform sidelink communication.

The sidelink communication control according to an embodiment includes the steps of determining, by the remote UE 100A having sidelink connection with the relay UE 100B, a network communication state between the remote UE 100A and the cellular communication network (gNB 200), and performing, by the remote UE 100A, control related to sidelink communication between the remote UE 100A and the relay UE 100B, based on the network communication state. With this, sidelink communication between the remote UE 100A and the relay UE 100B can be appropriately controlled.

The sidelink communication control according to an embodiment includes the steps of determining, by the relay UE 100B having sidelink connection with the remote UE 100A, a communication state between the relay UE 100B and the cellular communication network (gNB 200) or a communication state between the relay UE 100B and another UE 100C, and performing, by the relay UE 100B, control related to sidelink communication between the relay UE 100B and the remote UE 100A, based on the communication state determined. With this, sidelink communication between the remote UE 100A and the relay UE 100B can be appropriately controlled.

(1) Sidelink Communication Control by Remote UE 100A (1.1) Operation Pattern 1

Operation pattern 1 of the sidelink communication control by the remote UE 100A according to an embodiment will be described.

In operation pattern 1 of the sidelink communication control by the remote UE 100A, the remote UE 100A having sidelink connection with the relay UE 100B detects improvement in the network communication state between the remote UE 100A and the cellular communication network. Then, in response to the detection of the improvement, the remote UE 100A performs processing for suspending sidelink communication between the remote UE 100A and the relay UE 100B.

With this, when the network communication state between the remote UE 100A and the cellular communication network improves after sidelink relay is started, the remote UE 100A can switch sidelink relay communication to direct communication with the cellular communication network.

Figure 13:
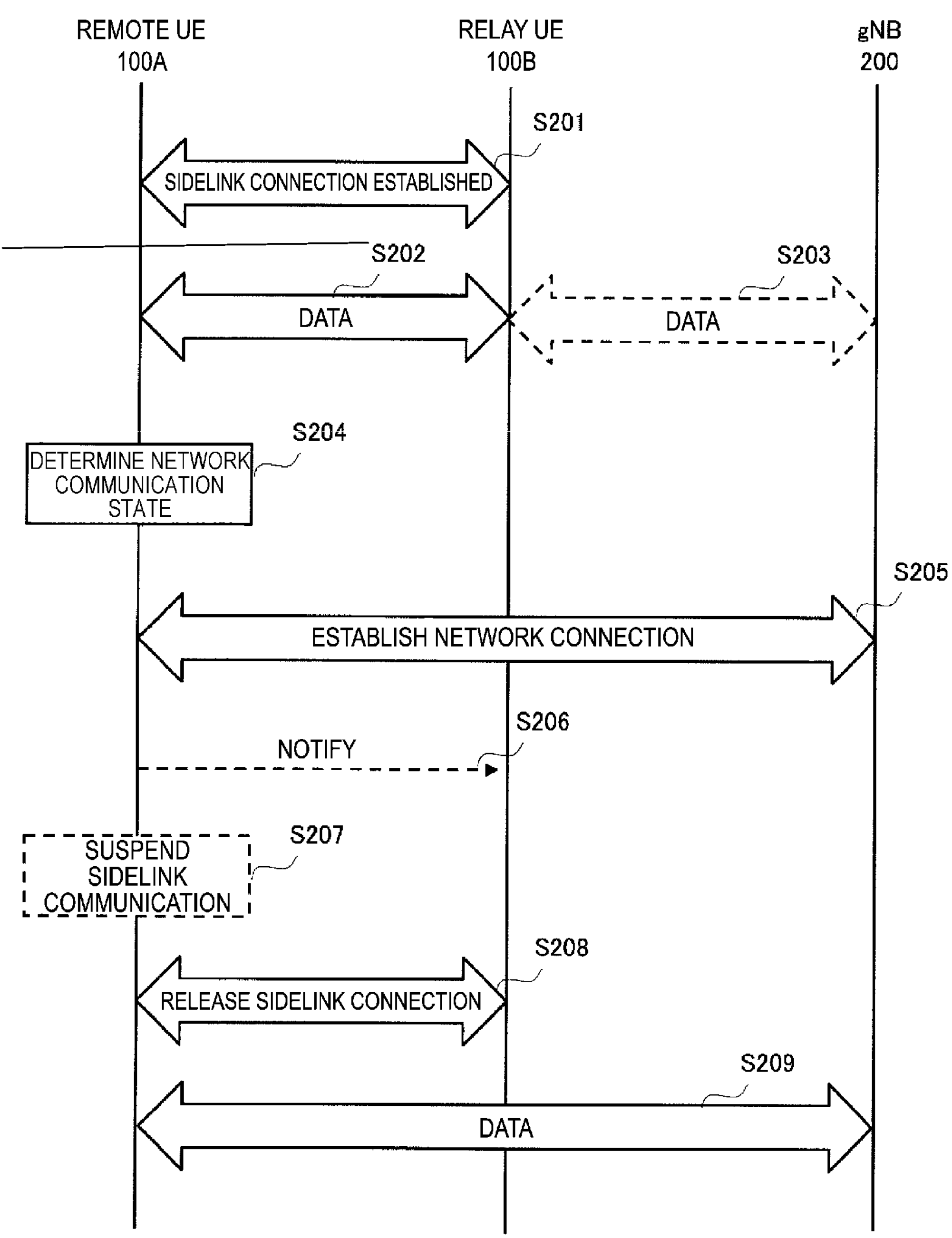
FIG. 13 is a diagram illustrating operation pattern 1 of sidelink communication control by a remote UE according to an embodiment.

FIG. 13 is a diagram illustrating operation pattern 1 of the sidelink communication control by the remote UE 100A according to an embodiment. FIG. 13 mainly assumes a case in which the remote UE 100A having sidelink connection with the relay UE 100B moves from an area out of the coverage to an area within the coverage. Note that, in FIG. 13, unnecessary steps are illustrated with broken lines.

As illustrated in FIG. 13, in Step S201, the remote UE 100A has sidelink connection being established with the relay UE 100B. The relay mode of the relay UE 100B may be either the U2N relay or the U2U relay.

In Step S202, the remote UE 100A transmits and receives data to and from the relay UE 100B.

In Step S203, the relay UE 100B relays the data transmitted and received by the remote UE 100A. Although FIG. 13 illustrates an example in which the relay UE 100B transmits and receives relay data to and from the gNB 200, the relay UE 100B may transmit and receive relay data to and from another UE 100C.

In Step S204, the remote UE 100A determines the network communication state between the remote UE 100A and the cellular communication network (gNB 200) and detects a change in the network communication state.

For example, in Step S204, the remote UE 100A detects that the remote UE 100A has moved from an area out of the coverage to an area within the coverage. The remote UE 100A may detect the movement to the area within the coverage, based on that received power (RSRP) of a reference signal received from the cellular communication network has exceeded a threshold. The remote UE 100A may detect the movement to the area within the coverage, based on reception of a synchronization signal from the cellular communication network.

Alternatively, in Step S204, the remote UE 100A may detect that the remote UE 100A has transitioned from the RRC idle state or the RRC inactive state to the RRC connected state (Step S205 to be described below).

Here, the threshold to be compared with the RSRP and the network communication state to be detected by the remote UE 100A may be configured from the gNB 200 using system information (SIB) or the like, or may be a threshold defined in advance (for example, S-criteria) and/or a configuration written in a Subscriber Identity Module (SIM) or the like in advance (Pre-configuration).

In Step S205, the remote UE 100A establishes network connection with the gNB 200, and transitions to the RRC connected state. Note that Step S205 may be performed after Step S208 to be described below, for example, between Step S208 and Step S209 to be described below.

In response to the detection of the change in the network communication state, the remote UE 100A performs processing for suspending sidelink communication between the remote UE 100A and the relay UE 100B.

As such processing, the remote UE 100A may notify the relay UE 100B of the change in the network communication state (for example, the transition to the RRC connected state) (Step S206). Here, the remote UE 100A may notify the remote UE 100A of received power (RSRP) of the reference signal received from the cellular communication network. Such a notification may be performed using a PC5-RRC message or a PC5-S message.

Based on the notification from the remote UE 100A, the relay UE 100B may perform processing of releasing the sidelink connection with the remote UE 100A. For example, the relay UE 100B discards a PC5-RRC entity and/or a PC5-S entity and transmits a PC-RRC release instruction to the remote UE 100A.

In response to the detection of the change in the network communication state, the remote UE 100A may suspend sidelink communication with the relay UE 100B (Step S207). For example, the remote UE 100A causes communication timeout by not giving a response or the like to the relay UE 100B, and thereby implicitly notifies the relay UE 100B of release of the sidelink connection. The remote UE 100A may discard the PC5-RRC entity and/or the PC5-S entity of the remote UE 100A.

In Step S208, the remote UE 100A performs processing of releasing the sidelink connection with the relay UE 100B. For example, the remote UE 100A may explicitly notify the relay UE 100B of connection release by using a PC5-RRC message indicating release of the sidelink connection.

In Step S209, the remote UE 100A transmits and receives data through network communication with the gNB 200.

The present operation pattern describes the U2N relay but may be applied to the U2U relay. In this case, the gNB 200 in the present operation pattern may be interpreted as another UE (another remote UE) 100C, and the network communication state may be interpreted as a communication state between the remote UE 100A and another remote UE 100C. The remote UE 100A may detect that another remote UE 100C is present nearby (within a range in which direct communication can be performed) through a discovery procedure, for example (Step S204). Subsequently, in a manner the same as and/or similar to the present operation pattern, the remote UE 100A performs operation of releasing the sidelink connection with the relay UE 100B.

(1.2) Operation Pattern 2

Operation pattern 2 of the sidelink communication control by the remote UE 100A according to an embodiment will be described.

In operation pattern 2 of the sidelink communication control by the remote UE 100A, the relay UE 100B that performs the U2N relay transfers first system information broadcast by a first cell of the cellular communication network to the remote UE 100A. The remote UE 100A detects improvement in the network communication state with a second cell of the cellular communication network. In response to the detection of the improvement, the remote UE 100A acquires second system information broadcast by the second cell, not the first system information transferred from the relay UE 100B. With this, when the remote UE 100A moves to an area within coverage of the second cell different from the first cell connected by the remote UE 100A, the remote UE 100A can acquire system information of the second cell.

Figure 14:
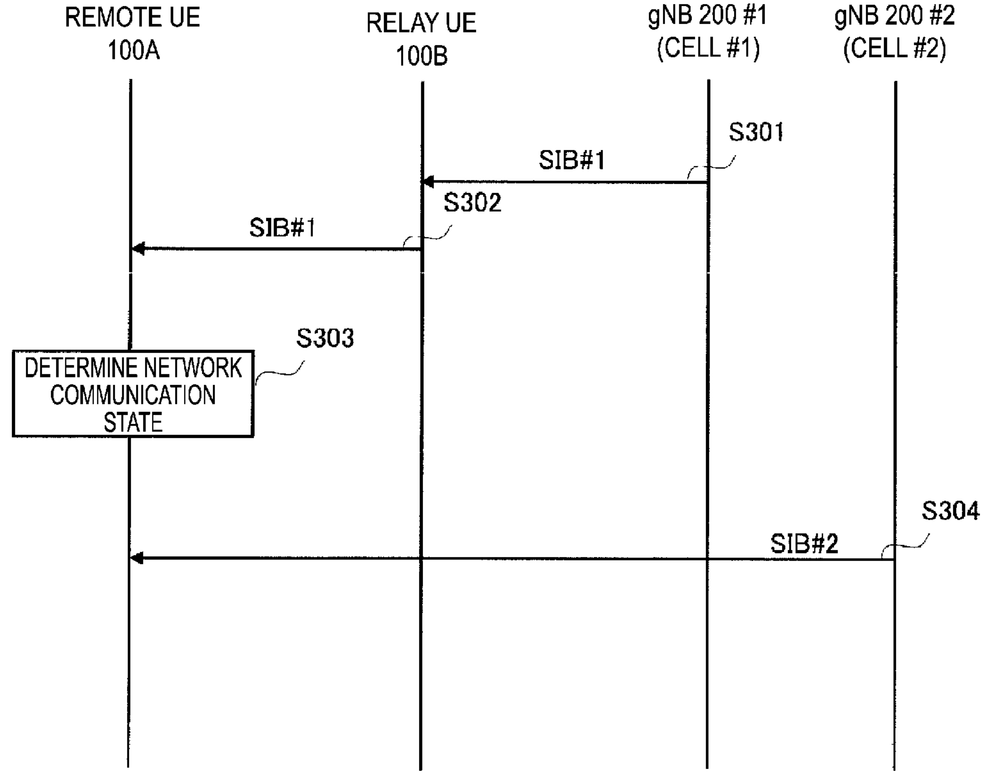
FIG. 14 is a diagram illustrating operation pattern 2 of the sidelink communication control by the remote UE according to an embodiment.

FIG. 14 is a diagram illustrating operation pattern 2 of the sidelink communication control by the remote UE 100A according to an embodiment. Although FIG. 14 illustrates an example in which gNB 200 #1 manages cell #1 (first cell) and gNB 200 #2 manages cell #2 (second cell), one gNB 200 may manage cell #1 and cell #2.

As illustrated in FIG. 14, in Step S301, the relay UE 100B located within the coverage of cell #1 receives (acquires) SIB #1 (first system information), which is system information of cell #1, from cell #1.

In Step S302, the relay UE 100B transfers SIB #1 to the remote UE 100A. The remote UE 100A located out of the coverage receives SIB #1 from the relay UE 100B and applies SIB #1.

In Step S303, the remote UE 100A determines the network communication state between the remote UE 100A and cell #2 and detects a change in the network communication state.

For example, in Step S303, the remote UE 100A detects that the remote UE 100A has moved from an area out of the coverage to an area within the coverage of cell #2. The remote UE 100A detects the movement to the area within the coverage of cell #2, based on that received power (RSRP) of a reference signal received from cell #2 has exceeded a threshold. The remote UE 100A may detect the movement to the area within the coverage of cell #2, based on reception of a synchronization signal from cell #2. Here, the threshold to be compared with the RSRP and the network communication state to be detected by the remote UE 100A may be configured from the gNB 200 using system information (SIB) or the like, or may be a threshold defined in advance (for example, S-criteria) and/or a configuration written in a SIM or the like in advance (Pre-configuration).

In Step S304, the remote UE 100A that has moved to the area within the coverage of cell #2 receives (acquires) SIB #2 (second system information), which is system information of cell #2, from cell #2. The remote UE 100A may discard configuration by SIB #1 transferred from the relay UE 100B.

Figure 15:
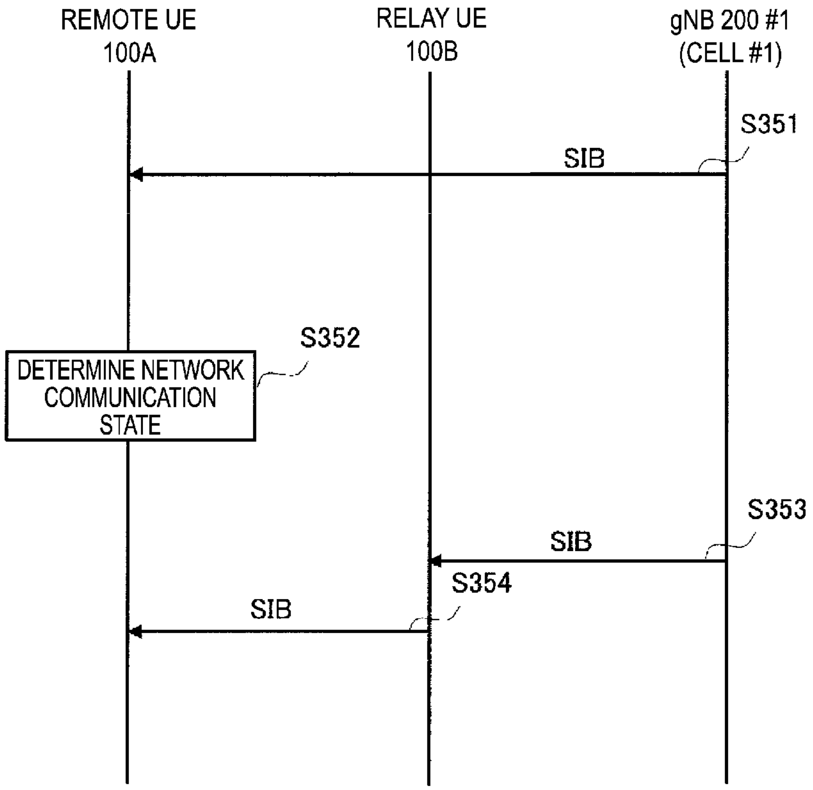
FIG. 15 is a diagram illustrating a variation of operation pattern 2 of the sidelink communication control by the remote UE according to an embodiment.

FIG. 15 is a diagram illustrating a variation of operation pattern 2 of the sidelink communication control by the remote UE 100A according to an embodiment. The variation assumes a case in which the remote UE 100A moves from an area within the coverage to an area out of the coverage.

As illustrated in FIG. 15, in Step S351, the remote UE 100A located within the coverage of cell #1 receives (acquires) an SIB from cell #1.

In Step S352, the remote UE 100A determines the network communication state between the remote UE 100A and cell #1 and detects a change in the network communication state.

For example, in Step S352, the remote UE 100A detects that the remote UE 100A has moved from an area within the coverage of cell #1 to an area out of the coverage. The remote UE 100A may detect the movement to the area out of the coverage, based on that received power (RSRP) of a reference signal received from cell #1 has fallen below a threshold. Here, the threshold to be compared with the RSRP may be configured from the gNB 200 using system information (SIB) or the like, or may be a threshold defined in advance (for example, S-criteria) and/or a configuration written in a SIM or the like in advance (Pre-configuration).

Here, the remote UE 100A may perform the relay UE discovery procedure and/or the relay UE selection procedure described above and establish sidelink connection with the relay UE 100B.

In Step S353, the relay UE 100B located within the coverage of cell #1 receives (acquires) an SIB from cell #1.

In Step S354, the relay UE 100B transfers the SIB to the remote UE 100A. The remote UE 100A located out of the coverage receives the SIB from the relay UE 100B and applies the SIB.

Note that, although FIG. 15 illustrates an example in which the relay UE 100B is located within the coverage of cell #1, the relay UE 100B may be located in another cell (cell #2). In this case, the relay UE 100B transfers the SIB of cell #2 to the remote UE 100A out of the coverage. The remote UE 100A may discard configuration by the SIB of cell #1.

(2) Communication Control by Relay UE 100B

The sidelink communication control by the relay UE 100B according to an embodiment will be described.

The relay UE 100B having sidelink connection with the remote UE 100A detects deterioration in a communication state between the relay UE 100B and the cellular communication network (gNB 200) or a communication state between the relay UE 100B and another UE 100C. In response to the detection of the deterioration, the relay UE 100B performs predetermined processing for suspending sidelink communication with the remote UE 100A.

The remote UE 100A cannot recognize the communication state between the relay UE 100B and the cellular communication network (gNB 200) or the communication state between the relay UE 100B and another UE 100C and has difficulty in determining whether the sidelink relay can be continued. When the relay UE 100B detects deterioration in the communication state, the relay UE 100B performs predetermined processing for suspending sidelink communication with the remote UE 100A, and thereby enables the remote UE 100A to perform processing such as relay UE re-selection processing.

In the predetermined processing, the relay UE 100B may transmit, to the remote UE 100A, a re-selection instruction for causing the remote UE 100A to re-select a relay UE 100B other than the relay UE 100B. When the relay UE 100B detects deterioration in the communication state between the relay UE 100B and another UE 100C, the relay UE 100B may notify the remote UE 100A of such another UE.

Figure 16:
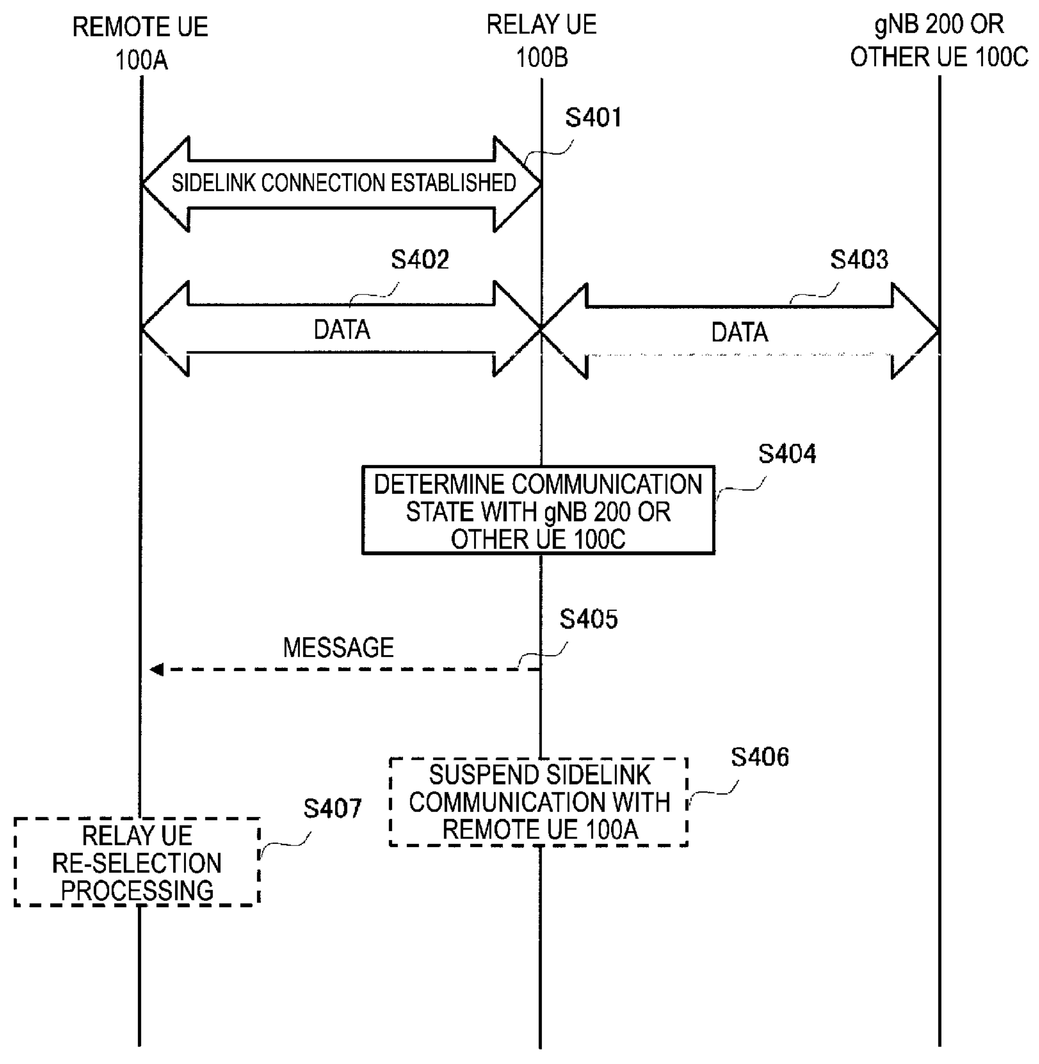
FIG. 16 is a diagram illustrating sidelink communication control by a relay UE according to an embodiment.

FIG. 16 is a diagram illustrating the sidelink communication control by the relay UE 100B according to an embodiment. Note that, in FIG. 16, unnecessary steps are illustrated with broken lines.

As illustrated in FIG. 16, in Step S401, the remote UE 100A has sidelink connection being established with the relay UE 100B. The relay mode of the relay UE 100B may be either the U2N relay or the U2U relay.

In Step S402, the remote UE 100A transmits and receives data to and from the relay UE 100B.

In Step S403, the relay UE 100B relays the data transmitted and received by the remote UE 100A. Specifically, the relay UE 100B transmits and receives relay data to and from the gNB 200 or another UE 100C.

In Step S404, the relay UE 100B determines the communication state between the relay UE 100B and the cellular communication network (gNB 200) or the communication state between the relay UE 100B and another UE 100C and detects deterioration in the communication state.

For example, in a case of the U2N relay, the relay UE 100B may detect at least one of a Radio Link Failure (RLF) in network connection with the gNB 200, a recovery failure in RRC connection, and RRC connection release. The relay UE 100B may detect that received power (RSRP) of a reference signal received from the gNB 200 or throughput of network communication with the gNB 200 has fallen below a threshold, or that resource utilization (occupancy) of network communication with the gNB 200 has exceeded a threshold.

In contrast, in a case of the U2U relay, the relay UE 100B may detect at least one of an RLF in sidelink connection with another UE 100C, PC5-RRC connection release, PC5-S connection release, a failure in PC5-RRC connection establishment, and a failure in PC5-S connection establishment. The relay UE 100B may detect that received power (RSRP) of a reference signal received from another UE 100C or throughput of sidelink communication with another UE 100C has fallen below a threshold, or that resource utilization (occupancy) of sidelink communication with another UE 100C has exceeded a threshold.

Note that the threshold may be configured from the gNB 200 using system information (SIB) or the like, may be a threshold defined in advance (for example, S-criteria), or may be a configuration written in a SIM or the like in advance (Pre-configuration).

In Step S405, the relay UE 100B determines deterioration in the communication state between the relay UE 100B and the cellular communication network (gNB 200) or the communication state between the relay UE 100B and another UE 100C and transmits a message indicating the deterioration in the communication state to the remote UE 100A. The message may be a PC5-RRC message transmitted by means of unicasting or may be a message transmitted by means of broadcasting.

For example, the message of Step S405 may be a re-selection instruction instructing the remote UE 100A to perform the relay UE re-selection processing. In a case of the U2U relay, the message may include a destination ID indicating another UE 100C with a deteriorated sidelink communication state. The message may include information indicating whether the deterioration in the communication state is deterioration in the network communication state or deterioration in the sidelink communication state.

The message of Step S405 may be a suspend instruction indicating temporary suspension of sidelink communication with the remote UE 100A. In this case, when the communication state between the relay UE 100B and the cellular communication network (gNB 200) or the communication state between the relay UE 100B and another UE 100C improves, the relay UE 100B may transmit, to the remote UE 100A, a resume instruction indicating resumption of sidelink communication with the remote UE 100A. These instructions may include information indicating Causes (based on the above detection results).

The message of Step S405 may be a discovery message. The discovery message includes a list of identifiers of other UEs 100C with which the relay UE 100B has sidelink connection. When the relay UE 100B detects deterioration in a communication state with any one of the UEs 100C in the list, the relay UE 100B updates the list to eliminate an identifier of the UE 100C and notifies the remote UE 100A of a discovery message including the updated list. With this, the remote UE 100A can correctly recognize other UEs 100C with which sidelink relay communication can be performed. Note that, when the list includes an identifier of the gNB 200 (that is, in a case of the U2N relay), the identifier (a cell ID, an identifier indicating network connection, or the like) may be eliminated from the list.

The message of Step S405 may be the relay UE message described above. In other words, in response to change (determination) of a communication state with the gNB 200 or another UE 100C, the relay UE 200B triggers transmission of the relay UE message described above.

In Step S406, the relay UE 100B may perform processing for suspending sidelink communication with the remote UE 100A. For example, the relay UE 100B may cause communication timeout by not giving a response or the like to the remote UE 100A, and thereby implicitly notify the remote UE 100A of release of the sidelink connection. The relay UE 100B may explicitly notify the remote UE 100A of connection release by using a PC5-RRC message indicating release of the sidelink connection.

In Step S407, the remote UE 100A may trigger the relay UE re-selection processing, based on the message received from the relay UE 100B in Step S405, for example. Here, the remote UE 100A may perform the relay UE re-selection processing after excluding the relay UE 100B that has transmitted the message from the re-selection candidates. In the remote UE 100A, the AS layer may notify an upper layer (PC5-S or the like) of reception of the message (and details of the message). In this case, the upper layer may exclude the relay UE 100B that has transmitted the message from targets to be discovered in the relay UE discovery procedure.

OTHER EMBODIMENTS

The sequences described above can be separately and independently implemented, and also be implemented in combination of two or more steps of different sequences.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the processes to be performed by the UE 100 or the gNB 200 may be integrated, and at least part of the UE 100 or the gNB 200 may be configured as a semiconductor integrated circuit (a chipset or an SoC).

Embodiments have been described above in detail with reference to the drawings, but specific configurations are not limited to those described above, and various design variations can be made without departing from the gist of the present disclosure.

The invention claimed is:

1. A communication control method used in a cellular communication system, the communication control method comprising:

detecting, by a relay user equipment having a sidelink connection with a remote user equipment, a Radio Link Failure (RLF) between the relay user equipment and a cellular communication network or between the relay user equipment and another user equipment other than the cellular communication network; and transmitting, by the relay user equipment, a PC5-RRC message including information indicating the detected RLF to the remote user equipment, the information including a first information element and a second information element for indicating a type of the detected RLF, the first information element configured to indicate that the detected RLF is between the relay user equipment and the cellular communication network, the second information element configured to indicate that the detected RLF is between the relay user equipment and the another user equipment.

2. A relay user equipment used in a cellular communication system, the relay user equipment comprising a controller configured to detect, in a state of the relay user equipment having a sidelink connection with a remote user equipment, Radio Link Failure (RLF) between the relay user equipment and a cellular communication network or between the relay user equipment and another user equipment other than the cellular communication network, and a transmitter configured to transmit a PC5-RRC message including information indicating the detected RLF to the remote user equipment, the information including a first information element and a second information element for indicating a type of the detected RLF, the first information element configured to indicate that the detected RLF is between the relay user equipment and the cellular communication network, the second information element configured to indicate that the detected RLF is between the relay user equipment and the another user equipment.

3. An apparatus for controlling a relay user equipment used in a cellular communication system, the apparatus comprising a processor and a memory coupled to the processor, the processor configured to:

detect, in a state of the relay user equipment having a sidelink connection with a remote user equipment, Radio Link Failure (RLF) between the relay user equipment and a cellular communication network or between the relay user equipment and another user equipment other than the cellular communication network, and transmit a PC5-RRC message including information indicating the detected RLF to the remote user equipment, the information including a first information element and a second information element for indicating a type of the detected RLF, the first information element configured to indicate that the detected RLF is between the relay user equipment and the cellular communication network, the second information element configured to indicate that the detected RLF is between the relay user equipment and the another user equipment.

* * * * *